United States Patent
Tomita (10) Patent No.: US 7,082,082 B2
(45) Date of Patent: Jul. 25, 2006

(54) APPARATUS FOR RECORDING AND PLAYING BACK INFORMATION FROM AN OPTICAL DISK HAVING PEP AND BCA BLOCKS

(75) Inventor: Yoshimi Tomita, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 407 days.

(21) Appl. No.: 10/193,991

(22) Filed: Jul. 15, 2002

(65) Prior Publication Data

US 2003/0016603 A1 Jan. 23, 2003

(30) Foreign Application Priority Data

Jul. 17, 2001 (JP) ............... 2001-216582

(51) Int. Cl.
*G11B 13/00* (2006.01)
*G11B 20/18* (2006.01)

(52) U.S. Cl. .................. 369/14; 369/275.3; 369/53.22; 369/47.27

(58) Field of Classification Search ............. 369/275.3, 369/14, 275.1, 275.2, 275.4, 280, 282, 287, 369/292; 428/64.1, 64.3, 64.4
See application file for complete search history.

(56) References Cited

U.S. PATENT DOCUMENTS

| | | | | |
|---|---|---|---|---|
| 5,959,280 A | * | 9/1999 | Kamatani | .................. 369/52.1 |
| 6,034,934 A | * | 3/2000 | Miyake et al. | ........... 369/53.28 |
| 6,034,937 A | * | 3/2000 | Kumagai | ................. 369/47.26 |
| 6,081,785 A | * | 6/2000 | Oshima et al. | ................. 705/1 |
| 6,233,649 B1 | | 5/2001 | Hirayama et al. | ............. 711/4 |
| 6,295,262 B1 | * | 9/2001 | Kusumoto et al. | ........ 369/53.37 |
| 6,519,213 B1 | * | 2/2003 | Song et al. | .............. 369/44.26 |
| 6,606,294 B1 | * | 8/2003 | Takemura et al. | ....... 369/275.3 |
| 6,608,804 B1 | * | 8/2003 | Shim | ........................ 369/53.22 |
| 6,728,181 B1 | * | 4/2004 | Shimoda et al. | ........... 369/53.2 |
| 6,904,232 B1 | * | 6/2005 | Ayat et al. | ................... 386/125 |
| 6,938,162 B1 | * | 8/2005 | Nagai et al. | ................. 369/273 |
| 6,977,880 B1 | * | 12/2005 | Tomita | .................... 369/275.3 |
| 2001/0030932 A1 | * | 10/2001 | Spruit et al. | ............. 369/275.2 |
| 2002/0060968 A1 | * | 5/2002 | Senshu | .................... 369/59.25 |

FOREIGN PATENT DOCUMENTS

| | | |
|---|---|---|
| EP | 1 115 117 A2 | 7/2001 |
| JP | 63-291218 | 11/1988 |
| JP | 6-76460 | 3/1994 |
| JP | 6-215382 | 8/1994 |
| JP | 10-188361 | 7/1998 |
| JP | 11-102576 | 4/1999 |
| KR | 255191 B1 | 2/2000 |

OTHER PUBLICATIONS

Information Recording Medium, Tomita Yoshimi (Japan, 2004-103078), Feb. 4, 2004.*

* cited by examiner

*Primary Examiner*—Tan Dinh
(74) *Attorney, Agent, or Firm*—Drinker Biddle & Reath LLP

(57) ABSTRACT

An optical disk, a recording apparatus and playing apparatus which can record various kinds of identification information in the form of a pit train and a bar code without decreasing the data recording area for main information. Both a first data block including a pit train indicating first identification information and a second data block including a bar code indicating second identification information are formed in the recording part at the same radius.

9 Claims, 9 Drawing Sheets

APPARATUS FOR RECORDING AND PLAYING BACK INFORMATION FROM AN OPTICAL DISK HAVING PEP AND BCA BLOCKS

BACKGROUND OF THE INVENTION

1. Field of the Invention

The present invention relates to an optical disk, an apparatus for recording a data block on the disk and an apparatus for playing the disk.

2. Description of the Related Background Art

Optical disks such as DVD-ROMs have an information area on the innermost part from which information can be read without using tracking servo control. One example of the information area is a PEP (phase encoding part) as shown in for example, Japanese Patent Publication No. 2543523. The PEP area is formed as a pre-pit train when a master disk for optical disks is manufactured. Identification information such as optical disk type and tracking method is recorded in the PEP area.

As the innermost information area, not only the PEP area but also a BCA (burst cutting area) is known (for example, Japanese Patent Laid-Open Publication No. Hei 10-188361). The BCA area is formed by a bar code on each disk when optical disks are manufactured. For example, in the case of DVD-ROMs, the BCA area is formed by removing a reflection film by a YAG (yttrium aluminum garnet) laser. Identification information such as a serial number for each optical disk is recorded in the BCA area.

Each of the PEP area and the BCA area is necessary to be an area approximately 0.5 mm in width on the optical disk. Therefore, an area approximately 1 mm in width on the innermost part is required for both of these areas. However, if both of the PEP area and the BCA area are formed on an optical disk, a data recording area in which main information such as image and audio signals is recorded is decreased.

SUMMARY OF THE INVENTION

It is, therefore, an object of the invention to provide an optical disk, a recording apparatus and a playing apparatus which can record various kinds of identification information in the form of a pit train and a bar code without decreasing the data recording area for the main information.

According to the present invention, there is provided an optical disk comprising a first data block including a pit train indicating first identification information and a second data block including a bar code indicating second identification information which are formed in a recording part at a same radius of the optical disk.

According to the present invention, there is provided a recording apparatus for recording a second data block signal including a bar code indicating second identification information on an optical disk in which a first data block including a pit train indicating first identification information is formed in a circular recording part at a predetermined radius, comprising: a recording actuator which writes a signal onto the optical disk; a detector which generates a position detecting signal when the writing point of the recording actuator is in a predetermined area of the circular recording part; and a controller which controls the recording actuator to record the second data block signal on the circular recording part when the position detecting signal is generated from the detector.

According to the present invention, there is provided a playing apparatus for an optical disk on which a first data block including a pit train indicating first identification information and a second data block including a bar code indicating second identification information are formed in the recording part at the same radius, comprising: a pickup which reads a signal recorded in the recording part of the optical disk and outputting the read signal; an extractor which extracts a first data signal component corresponding to the first data block and a second data signal component corresponding to the second data block from the read signal; a first demodulator which outputs the first identification information by demodulating the first data signal component output from the extractor; and a second demodulator which outputs the second identification information by demodulating the second data signal component output from the extractor.

DETAILED DESCRIPTION OF THE PREFERRED EMBODIMENTS

An embodiment of the present invention will be described in detail below with reference to the accompanying drawings.

Figure 1:
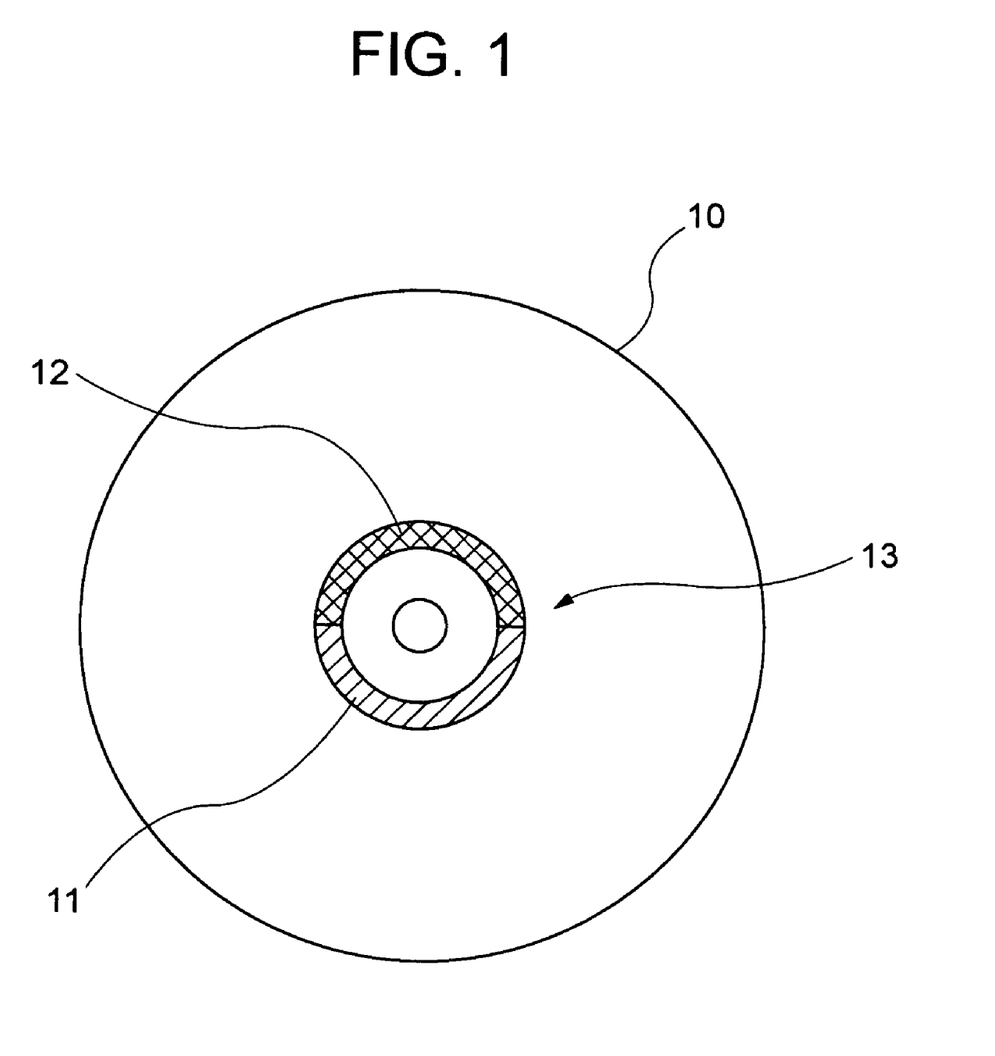
FIG. 1 is a plan view showing an optical disk of an embodiment of the present invention.

FIG. 1 shows an optical disk 10 according to the present invention. The optical disk 10 is a DVD-ROM, for example. The optical disk 10 has a circular recording part 13 consisting of a PEP (Phase Encoding Part) area 11 formed in half of the innermost recording part 13 and a BCA (Burst Cutting Area) 12 formed in the remaining half on one side. The width of the circular recording part 13 in the radial direction of the optical disk 10 is designed in view of the amount of eccentricity of the optical disk 10 during a period when the optical disk 10 is rotated, in order to read information from the recording part 13 without tracking servo control.

Figure 2:
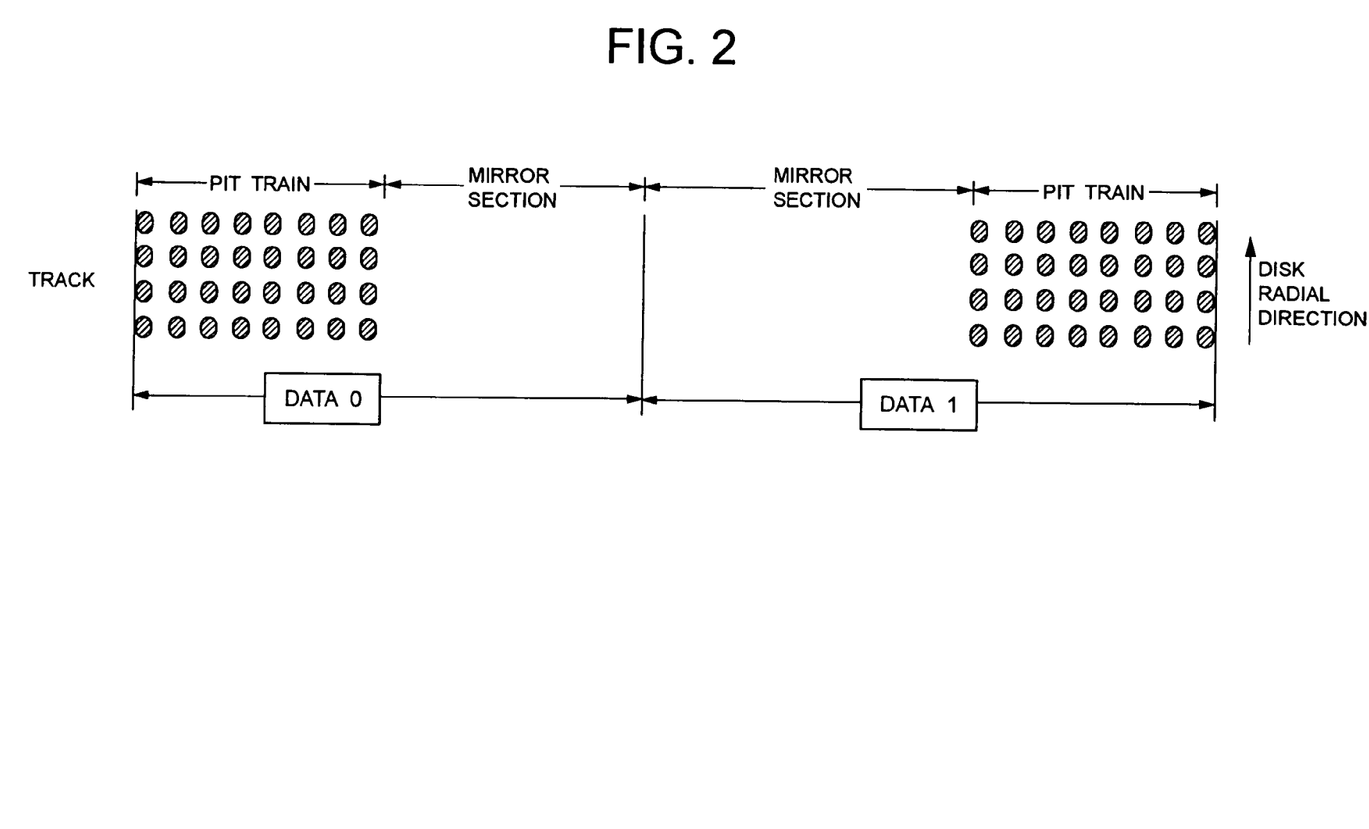
FIG. 2 is a diagram showing a pit pattern of a PEP area.

As shown in FIG. 2, a plurality of tracks are formed in the PEP area 11. In each of the tracks, one-bit data, Data 0, Data 1, . . . has a pit train and a mirror part.

Figure 3:
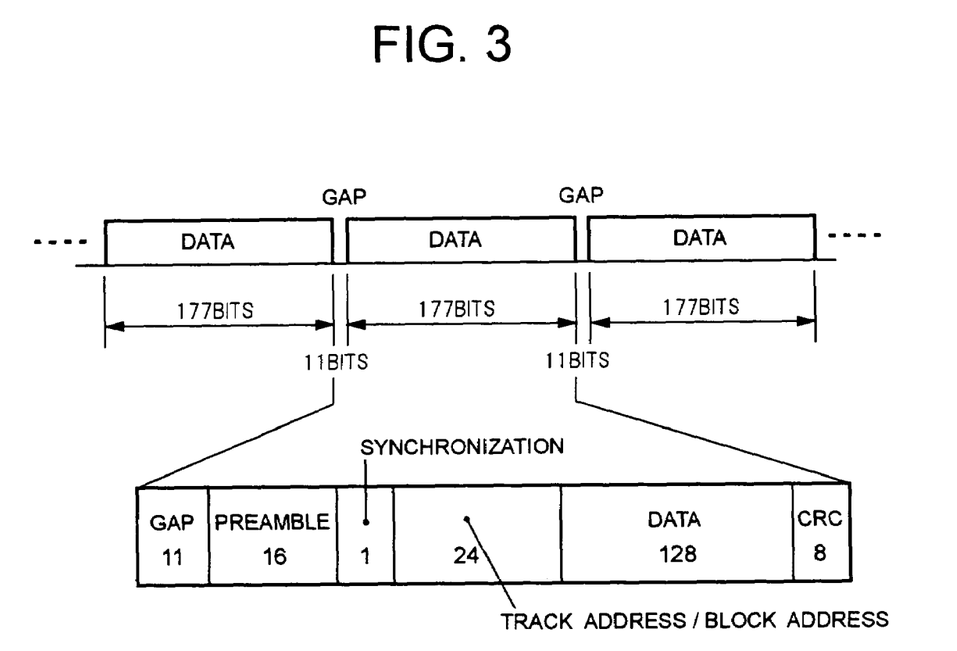
FIG. 3 is a diagram showing a recording format of a PEP area.

As shown in FIG. 3, a recording format in the PEP area 11 is formed for each block (sector) unit. Each block has a 177-bit length. A gap of 11 bits or 10.9 bits is formed between blocks. Each block consists of a 16-bit preamble, a 1-bit synchronization, a 24-bit track address and block address, a 128-bit data, and an 8-bit error detecting code (CRC). As one of the 128-bit data, identification information for identifying a servo system is recorded. The data includes signals regarding disk reflectivity, CAV or CLV, reading power, track type (land or group), etc. One-block data is repeatedly written into continuous blocks having a predetermined number (for example, 3) of blocks. In each track, the pits of the same data are arranged in the same radial direction of the disk 10 to read the data in the area by rotating the optical disk 10 at a constant angular velocity.

The PEP area 11 is formed when a master disk is manufactured. Therefore, any optical disk manufactured on the basis of the master disk has a PEP area 11 of the same content. The PEP area may be formed on all or half of the innermost part of the master disk. If at least one block can be read, the PEP area may be formed within a range shorter than half of the innermost part.

Figure 4:
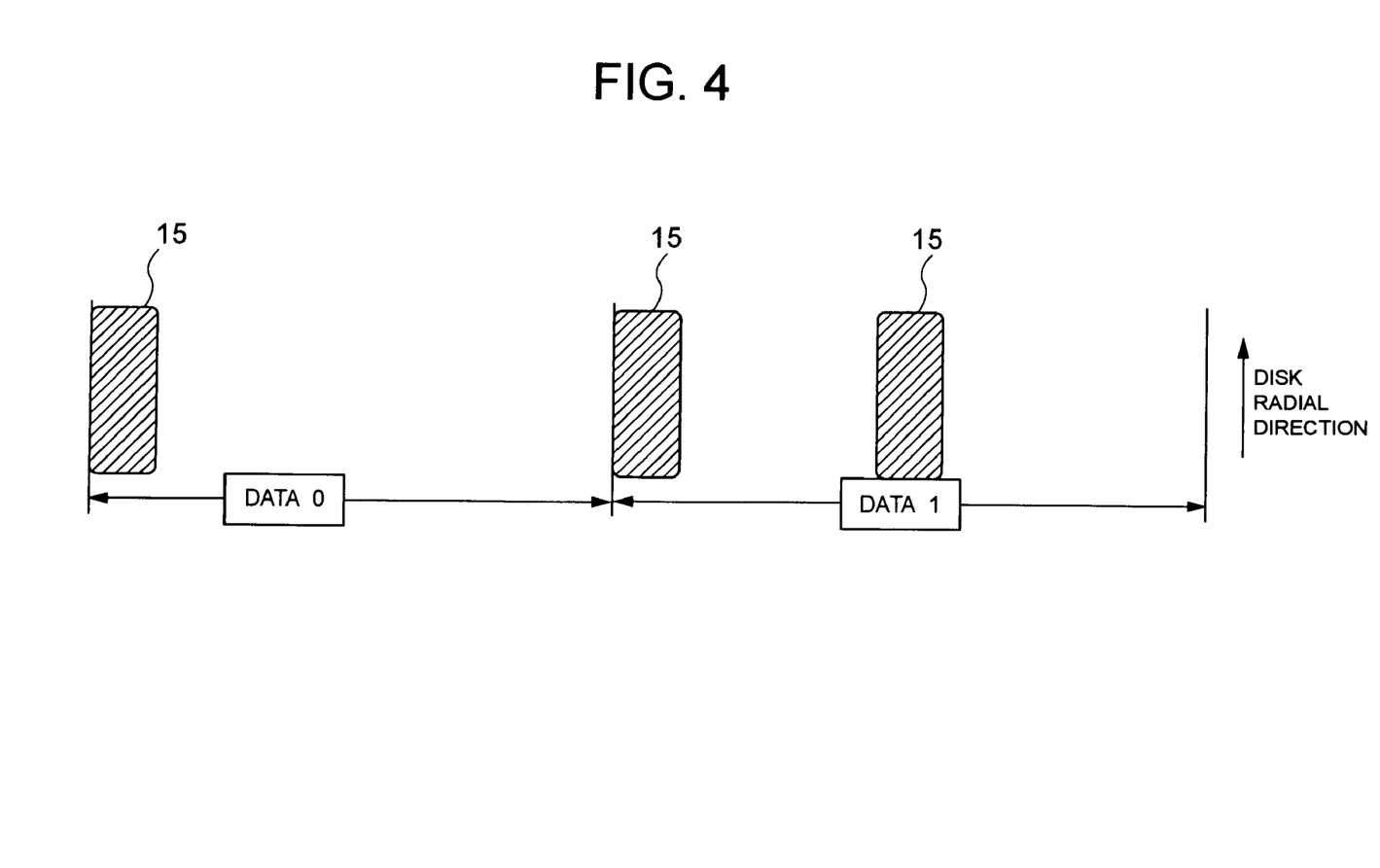
FIG. 4 is a diagram showing a bar code pattern of a BCA area.

The BCA area 12 is used for attaching individual disk information such as a serial number, to each optical disk manufactured from the master disk. The BCA area 12 is formed as a plurality of data blocks by writing using a YAG laser in the innermost recording part 13 of the optical disk 10 on which the PEP area has already been formed. By performing the writing on half of the innermost recording part 13, the PEP area 11 of the remaining half of the innermost recording part 13 is obtained. In the BCA area 12, information is recorded as one bit data, Data 0, Data 1, . . . , in the form of a bar code which consists of bars 15 extended in the radial direction of the disk (the direction crossing the track), as shown in FIG. 4.

Figure 5:
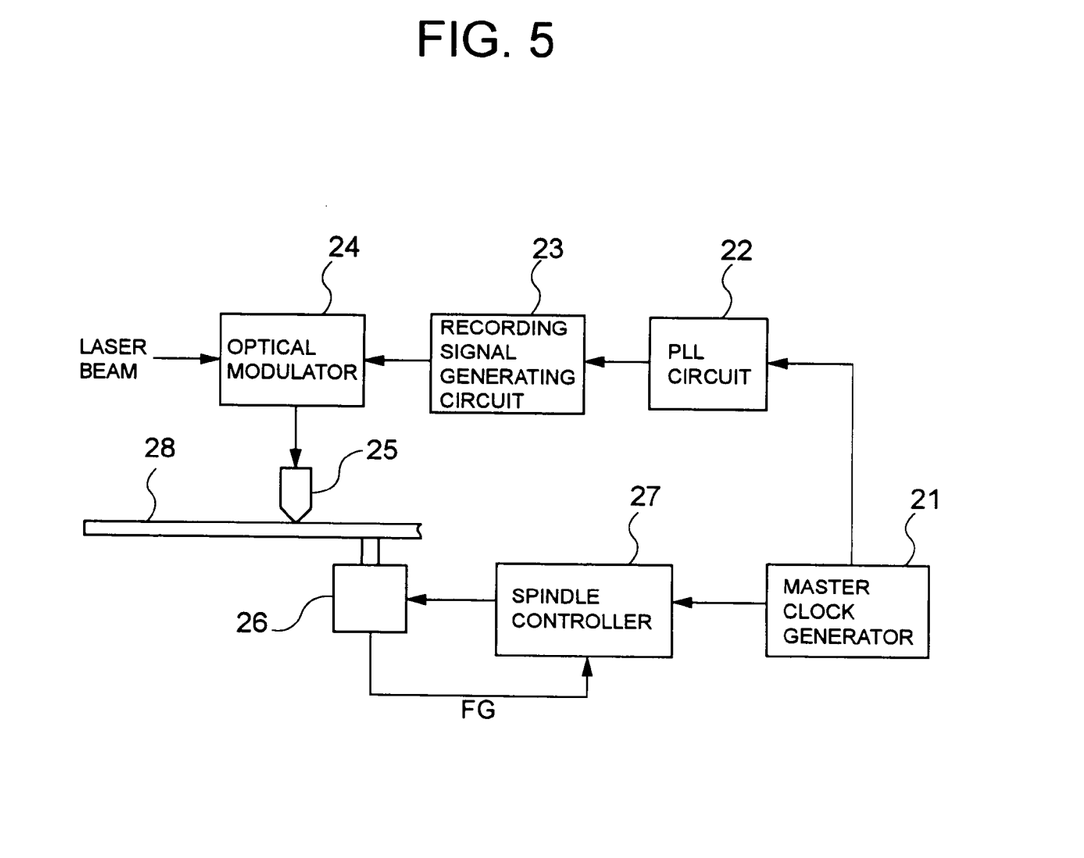
FIG. 5 is a block diagram showing a general configuration of a PEP recording apparatus.

FIG. 5 shows the schematic configuration of a PEP recording apparatus for forming a PEP area. The PEP recording apparatus includes a master clock generator 21, a PLL circuit 22, a recording signal generating circuit 23, an optical modulator 24, a recording actuator 25, a spindle motor 26, and a spindle controller 27. The master clock generator 21 generates a master clock signal and supplies the master clock signal to the PLL circuit 22 and the spindle controller 27. The spindle controller 27 is supplied with a frequency signal FG showing a rotational frequency of the spindle motor 26 as well as the master clock signal. The spindle controller 27 performs rotational control of the spindle motor 26, that is, spindle servo control so as to generate the frequency signal FG in synchronism with the master clock signal.

The PLL circuit 22 generates a recording clock signal based on the master clock signal. The recording signal generating circuit 23 performs PE (Phase Encoding) modulation corresponding to an information signal to be recorded in synchronism with the recording clock signal, and generates a PEP signal having the above-mentioned recording format. The modulator 24 modulates a laser beam in accordance with the PEP signal and supplies the modulated laser beam to the recording actuator 25. The recording actuator 25 performs exposure by irradiating the laser beam on the innermost recording part of an original disk 28 rotated by the spindle motor 26. The optical disk 10 is obtained by forming a master disk from the original disk 28, then using a stamper of the master disk to replicate optical disks.

Figure 6:
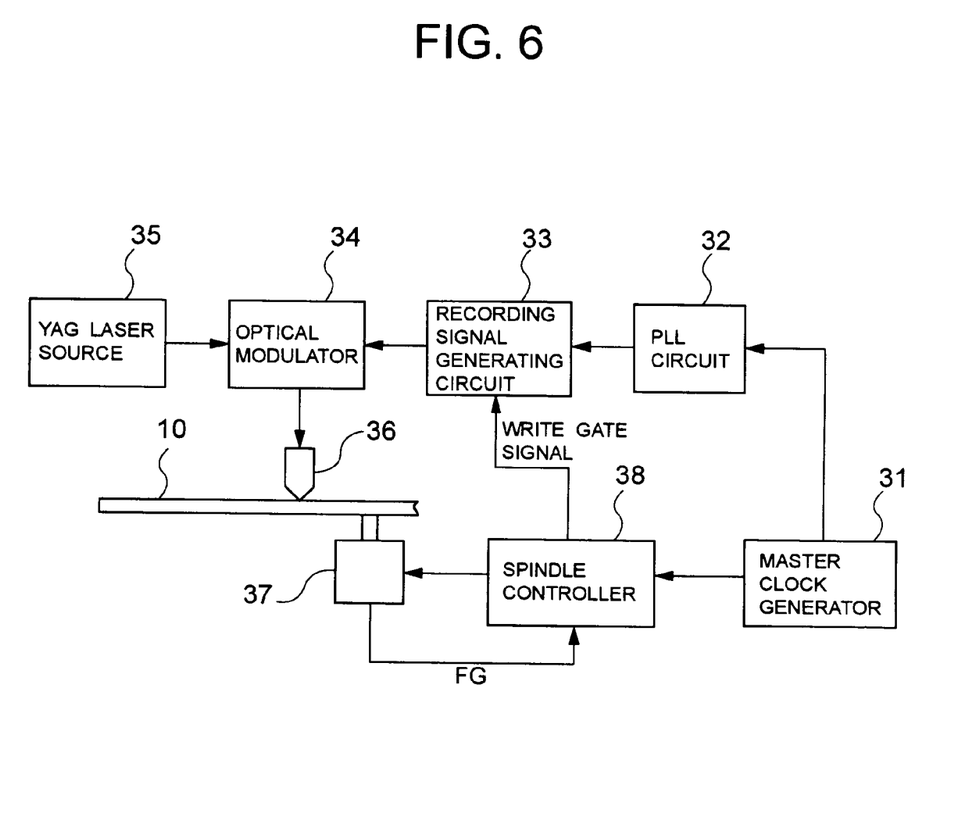
FIG. 6 is a block diagram showing a general configuration of a BCA recording apparatus.

FIG. 6 shows a schematic configuration of a BCA recording apparatus for forming the BCA area 12 of the optical disk 10. The BCA recording apparatus includes a master clock generator 31, a PLL circuit 32, a recording signal generating circuit 33, an optical modulator 34, a YAG laser source 35, a recording actuator 36, a spindle motor 37, and a spindle controller 38. The master clock generator 31 generates a master clock signal and supplies the master clock signal to the PLL circuit 32 and the spindle controller 38. The spindle controller 38 is supplied with a frequency signal FG showing a rotational frequency of the spindle motor 37 as well as the master clock signal. The spindle controller 38 performs rotational control of the spindle motor 37, that is, spindle servo control so as to generate the signaling frequency FG in synchronism with the master clock signal.

Figure 7:
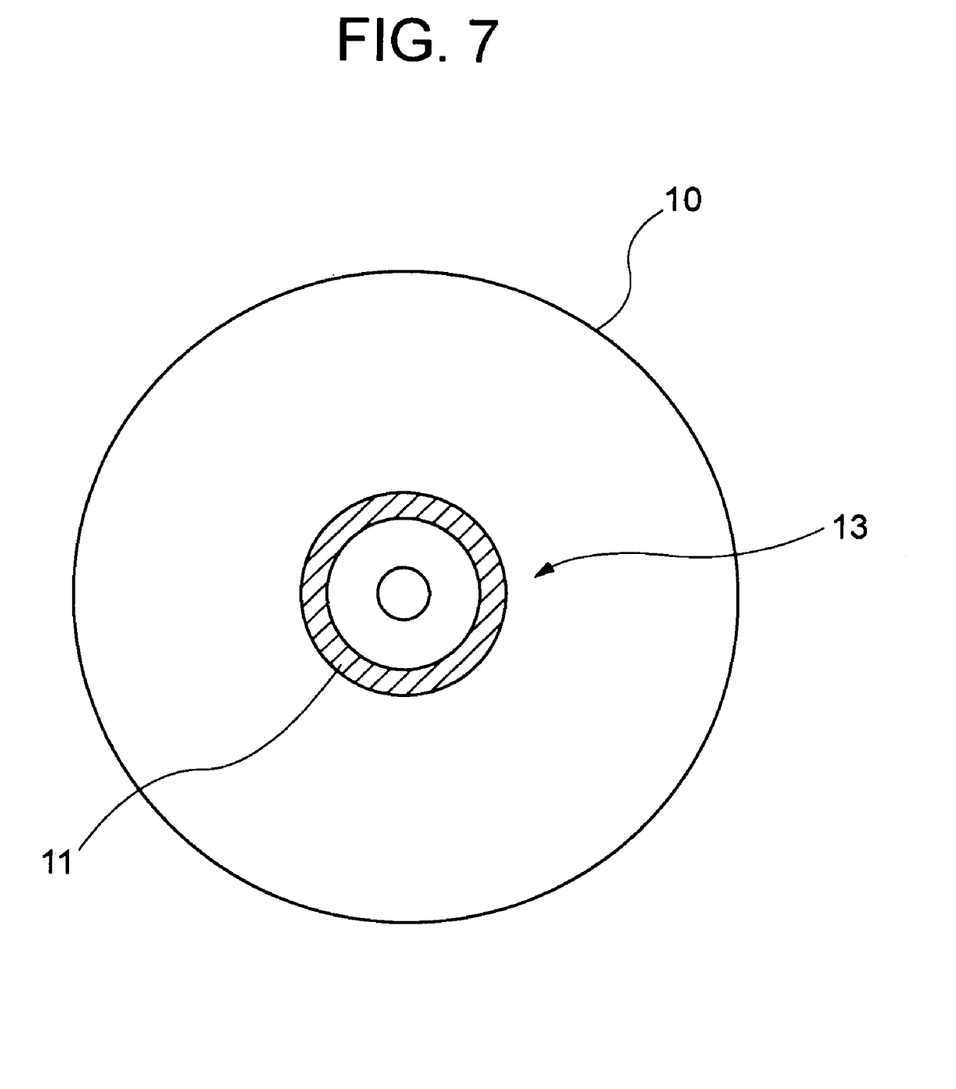
FIG. 7 is a diagram showing a PEP area formed on the whole of the innermost recording part.

The PLL circuit 32 generates a recording clock signal based on the master clock signal. The recording signal generating circuit 33 generates a BCA signal in accordance with an information signal to be recorded in synchronism with the recording clock signal. The BCA signal is output to the modulator 34 in response to a write gate signal obtained from the spindle controller 38. The write gate signal shows a writing position on the optical disk 10, that is, a range where the BCA area 12 is to be formed. The modulator 34 modulates a laser beam from the YAG laser source 35 in accordance with the BCA signal, and supplies the modulated laser beam to the recording actuator 36. The recording actuator 36 forms a bar code by irradiating the laser beam on the innermost recording part of the optical disk 10, which is rotated by the spindle motor 37, so as to remove a reflection film on the optical disk 10, and writes the BCA signal thereby. The writing is performed on only half of the innermost recording part. As shown in FIG. 7, if the PEP area 11 has already been formed on all of the innermost recording part 13 of the optical disk 10, the BCA area 12 is formed by being overwritten on the PEP area 11. If the PEP area 13 has already been formed on only half of the innermost recording part 13 of the optical disk 10, the BCA area 12 is formed by writing onto the remaining half of the innermost recording part 13.

Figure 8:
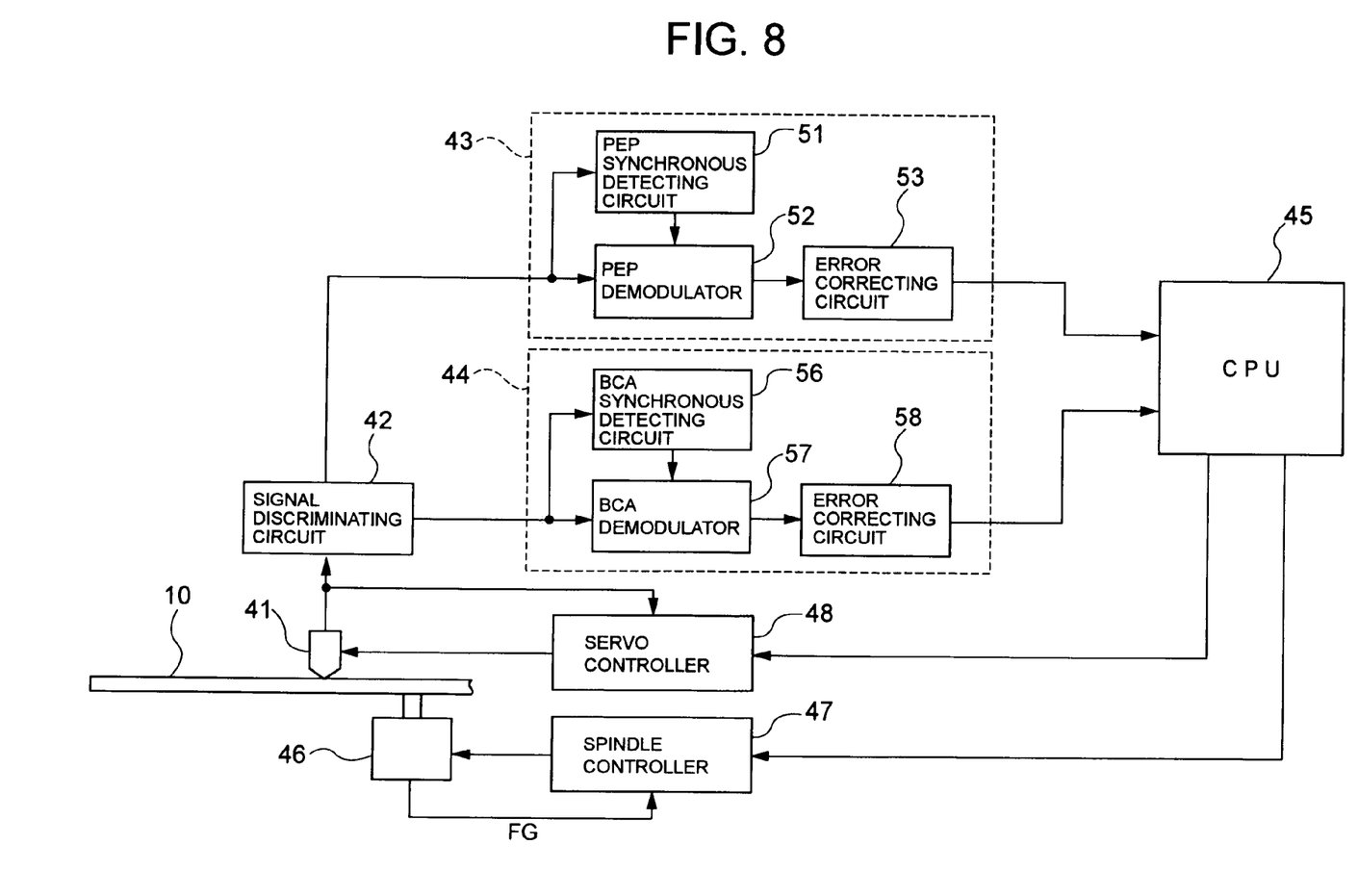
FIG. 8 is a block diagram showing the configuration of a playing apparatus.

FIG. 8 is a partial view of a playing apparatus for an optical disk 10 having the PEP area 11 and the BCA area 12. The playing apparatus includes a pickup 41, a signal discriminating circuit 42, a PEP signal processing system 43, a BCA signal processing system 44, and a CPU 45. The PEP signal processing system 43 has a PEP synchronous detecting circuit 51, a PEP demodulator 52, and an error correcting circuit 53. The BCA signal processing system 44 has a BCA synchronous detecting circuit 56, a BCA demodulator 57, and an error correcting circuit 58.

The pickup 41 optically reads a recorded signal from the optical disk 10 rotated by a spindle motor 46. The rotation of the spindle motor 46 is controlled by a spindle controller 47.

The signal discriminating circuit 42 extracts a PEP signal component and a BCA signal component of the signal read from the innermost recording part 13 of the optical disk 10 by the pickup 41.

Figures 9A, 9B:
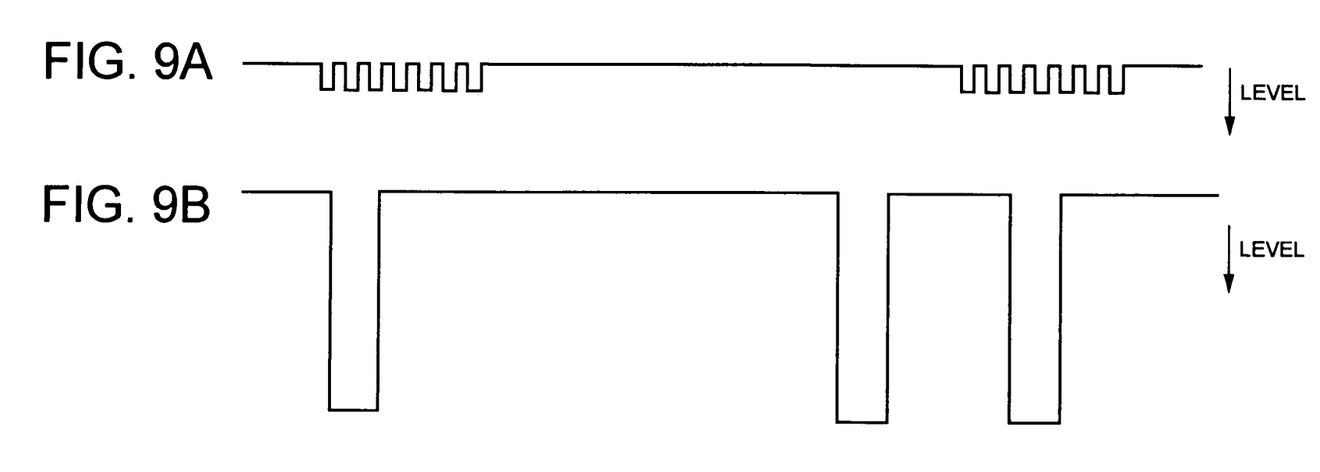
FIGS. 9A and 9B are diagrams showing a reading waveform for the PEP area and the BCA area.

The waveform of the signal read from the PEP area 11 of the optical disk 10 is shown in FIG. 9A. The waveform of the signal read from the BCA area 12 is shown in FIG. 9B. The amplitude level of the BCA signal component is greater than that of the PEP signal component, so that the type of signal component can be determined in accordance with the amplitude level of the signal read. The PEP signal component extracted by the signal discriminating circuit 42 is supplied to the PEP signal processing system 43. The BCA signal component extracted by the signal discriminating circuit 42 is supplied to the BCA signal processing system 44.

The PEP synchronous detecting circuit 51 of the PEP signal processing system 43 detects a synchronizing signal from the PEP signal component. The PEP demodulator 52 demodulates the PEP signal component in accordance with the detected synchronizing signal. The error correcting circuit 53 performs error correction for a signal output from the PEP demodulator 52 to obtain the original information signal and outputs the signal obtained to the CPU 45.

The BCA synchronous detecting circuit 56 of the BCA signal processing system 44 detects a synchronizing signal from the BCA signal component. The BCA demodulator 57 demodulates the BCA signal component in accordance with the detected synchronizing signal. The error correcting circuit 58 performs error correction for a signal output from the BCA demodulator 57 to obtain the original information signal and outputs the signal obtained to the CPU 45.

To read the innermost recording part 13 of the optical disk 10 in the playing apparatus, the reading point of the pickup 41 is moved to the innermost recording part 13. Spindle servo control by the spindle controller 47 for controlling the rotation of the spindle motor 46 at a predetermined speed and focusing servo control for focusing the reading point of the pickup 41 on the innermost recording part 13 are also carried out. Although the servo controller 48 performs tracking servo control for positioning the reading point of the pickup 41 on a track as well as the focusing servo control, it does not perform tracking servo control when the innermost recording part 13 is read. The control is performed by a command from the CPU 45 to the spindle controller 47 and to the servo controller 48.

In the embodiment described above, the PEP area 11 and the BCA area 12 are each formed on one half of the innermost recording part 13 of the optical disk 10. However, the present invention is not limited to the disclosed embodiment. A data block (a PEP block) recorded by the PEP recording apparatus may exist by mixing with a data block (a BCA block) recorded by the BCA recording apparatus in the innermost recording part 13 of the optical disk 10.

In the embodiment described above, the PEP block and the BCA block are both formed as a recording part at the same radius in the innermost recording part 13 of the optical disk 10. However, the two blocks may be formed in different ways. The recording part may be formed at the same radius in the outermost recording part of the optical disk.

The conditions for the mixed formation of PEP blocks and BCA blocks are described below.

If the PEP blocks are recorded on one track (one round) of the recording part 13 of the optical disk 10, the number of recordable blocks is m; if the BCA blocks are recorded on one track (one round) of the recording part 13 of the optical 10 disk, the number of recordable blocks is n; the number of BCA blocks to be actually recorded is $k_n$ ($k_n \geq 1$); the length of one BCA block at a distance r in the radial direction from the center of the optical disk 10 is $L_B$; and the length of one PEP block at the distance r is $L_p$, $L_B$ and $L_p$ can be expressed by the following equations.

$$L_B \times n = 2\pi r \quad (1)$$

$$L_p \times m = 2\pi r \quad (2)$$

Since the length required for the number $k_n$ of BCA blocks to be actually recorded is $L_B \times k_n$, the length of the remaining part of the circumference at the distance r is $2\pi r - L_B \times k_n$. The number of PEP blocks included in the remaining part is $(2\pi r - L_B \times k_n)/L_p$. If the number of PEP blocks included in the remaining part is greater than 1, at least one PEP block is not overlapped on the BCA block, so that one PEP block can be read from the beginning to the end continuously. The condition can be expressed by the following equation (3):

$$(2\pi r - L_B \times k_n)/L_p \geq 2 \quad (3)$$

When substituting $L_B = 2\pi r/n$ from equation (1) and $L_p = 2\pi r/m$ from equation (2) in equation (3), the following equation (4) is obtained.

$$m - (m/n)k_n \geq 2 \quad (4)$$

Therefore, if PEP blocks and BCA blocks are mixed in the innermost recording part 13 of the optical disk 10, it is necessary for both blocks to satisfy the condition of equation (4).

As described above, according to the optical disk of the present invention, various kinds of identification information can be recorded in the form of a pit train and a bar code without decreasing the data recording area for main information.

This application is based on a Japanese Patent Application No. 2001-216582 which is hereby incorporated by reference.

What is claimed is:

1. An optical disk in which a plurality of first data blocks each including a pit train indicating first identification information and a plurality of second data blocks each including a bar code indicating second identification information which are formed in a recording part at a same radius of said optical disk,
wherein, assuming that the number of the first data blocks on one round of said recording part is m, the number of the second data blocks on one round of said recording part is n, and the number of the second data blocks to be actuall recorded is $k_n$ ($k_n > 1$), the condition of $m-(m/n)k_n > 2$ is satisfied.

2. An optical disk according to claim 1, wherein said first data blocks are PEP (phase encoding part) blocks, and said second data blocks are BCA (burst cutting area) blocks, and said PEP blocks and said BCA blocks are formed in the innermost recording part having the form of circle as the recording part at said same radius.

3. An optical disk according to claim 2, wherein a PEP area having the PEP blocks only is formed in half of said innermost recording part, and a BCA area having the BCA blocks only is formed in the remaining half of said innermost recording part.

4. An optical disk according to claim 2, wherein after said PEP area having the PEP blocks only have been formed in all of said innermost recording part, said BCA blocks are overwritten in said innermost recording part.

5. An optical disk according to claim 4, wherein said BCA blocks are overwritten in half of said innermost recording part.

6. An optical disk according to claim 2, wherein said innermost recording part contains a predetermined plurality of tracks, each pit of said PEP blocks in each of said predetermined plurality of tracks is arranged in the same radial direction of the disk, and each bar of the bar code in each of said BCA blocks crosses said predetermined plurality of tracks in the radial direction of the disk.

7. An optical disk according to claim 2, wherein said PEP blocks are continuously formed by a predetermined number, all of the predetermined number of the continuous PEP blocks are data blocks of the same content.

8. An optical disk according to claim 1, wherein said first identification information is information common to a plurality of optical disks, and said second identification information is individual information for each of said plurality of optical disks.

9. A recording apparatus for recording a plurality of second data blocks each including a bar code indicating second identification information on an optical disk in which a plurality of first data blocks each including a pit train indicating first identification information are formed in a circular recording part at a predetermined radius, comprising:

a recording actuator which writes a signal onto said optical disk;

a spindle servo controller which generates a wnte gate signal when the writing point of said recording actuator is in a predetermined area of said circular recording part; and a recording controller which controls said recording actuator to record said second data block signal on said circular recording part when said write gate signal is generated from said spindle servo controller, wherein assuming that the number of the first data blocks on one round of said circular recording part is m, the number of the second data blocks on one round of said circular recording part is n, and the number of the second data blocks to be actuall recorded is $k_n(k_n>1)$, said recording controller performs the control of said recording actuator so that the condition of $m-(m/n)k_n>2$ is satisfied.

* * * * *